United States Patent
Grove

[11] 3,955,796
[45] May 11, 1976

[54] FLOW CONTROL APPARATUS

[75] Inventor: Marvin H. Grove, Houston, Tex.

[73] Assignee: M & J Valve Company, Houston, Tex.

[22] Filed: Feb. 12, 1975

[21] Appl. No.: 549,181

[52] U.S. Cl. .................... 251/172; 251/324; 251/361; 137/625.48
[51] Int. Cl.² .................................................. F16K 3/24
[58] Field of Search ........... 251/324, 325, 333, 361, 251/367, 172, 174, 190; 137/625.48, 625.67

[56] References Cited
UNITED STATES PATENTS

| | | | |
|---|---|---|---|
| 1,983,163 | 12/1934 | Buckman | 251/361 X |
| 2,892,644 | 6/1959 | Collins | 251/324 X |
| 3,280,833 | 10/1966 | Smith | 251/324 X |
| 3,737,140 | 6/1973 | Toth | 251/367 X |

FOREIGN PATENTS OR APPLICATIONS

| | | | |
|---|---|---|---|
| 371,484 | 1/1907 | France | 137/625.48 |

*Primary Examiner*—Arnold Rosenthal
*Attorney, Agent, or Firm*—Flehr, Hohbach, Test, Albritton & Herbert

[57] ABSTRACT

Flow control apparatus comprising a hollow body having openings or flow passages adapted to be connected to associated piping and a cylindrical closure which is reciprocated to form a seal or permit fluid flow. The sealing means consists of an annular assembly carried between two sections of the body having oppositely faced sealing members of resilient material.

6 Claims, 7 Drawing Figures

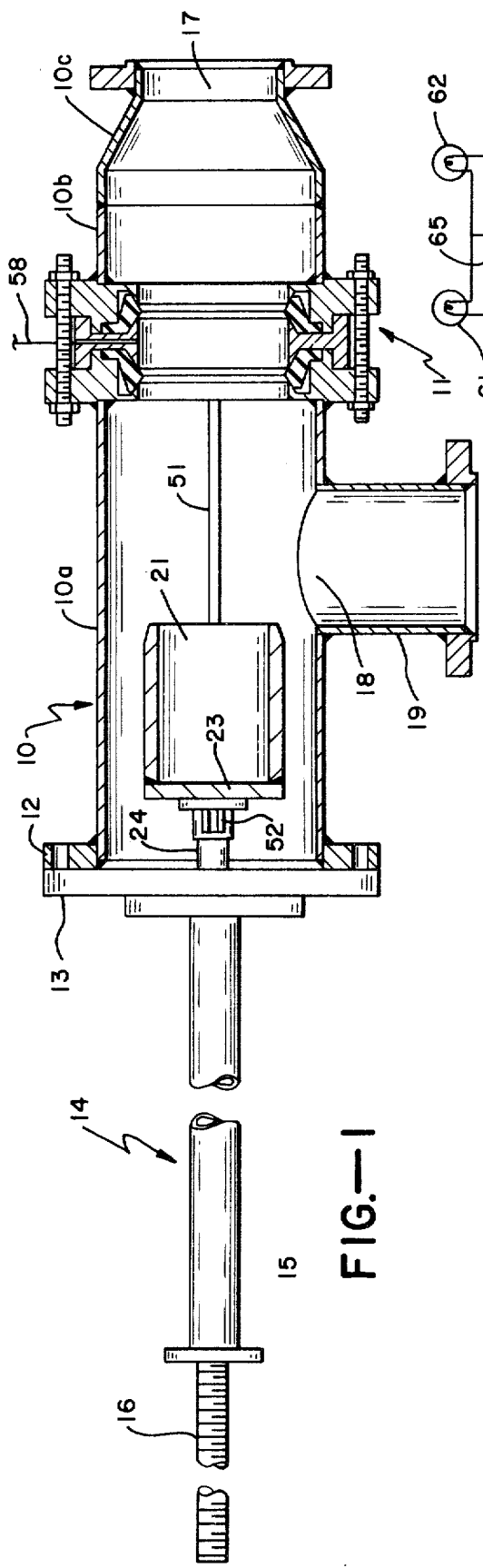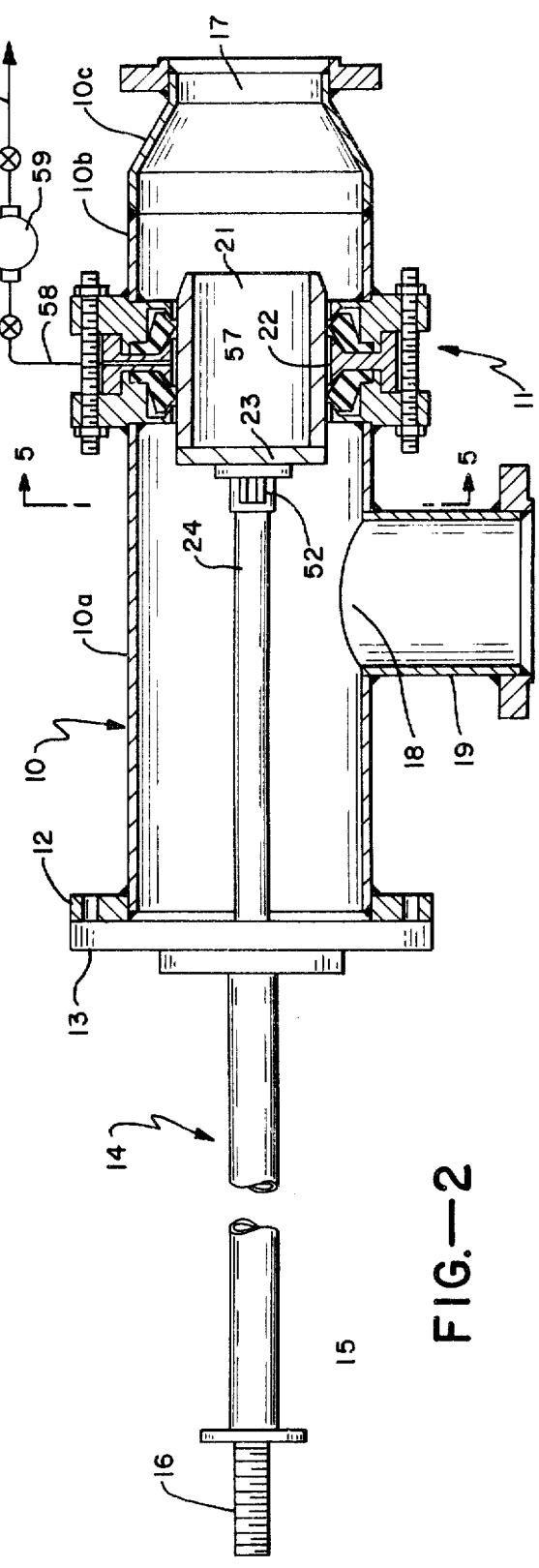

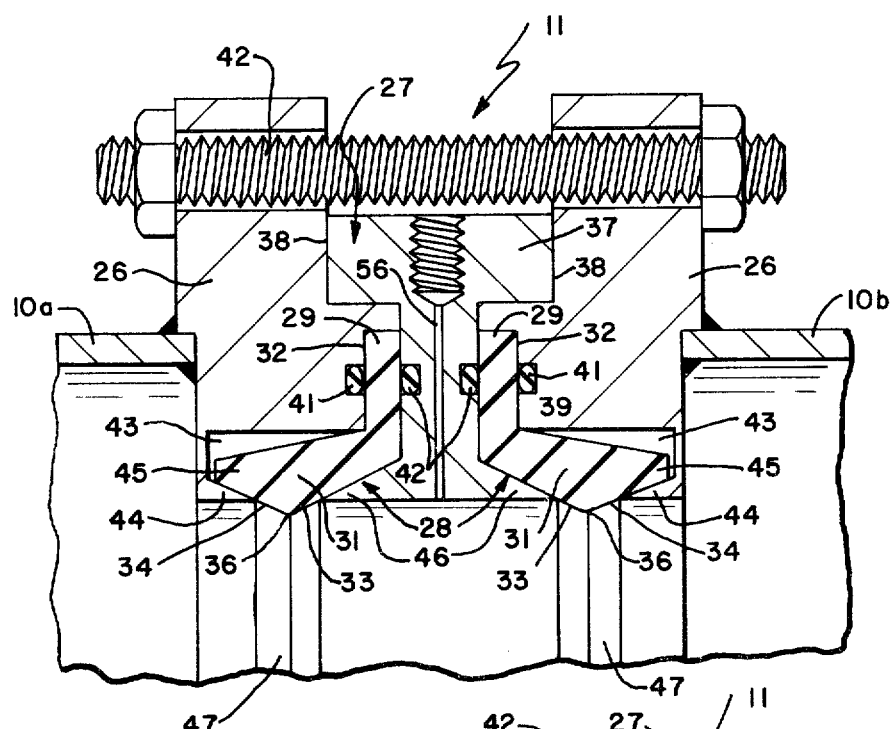
FIG.—3
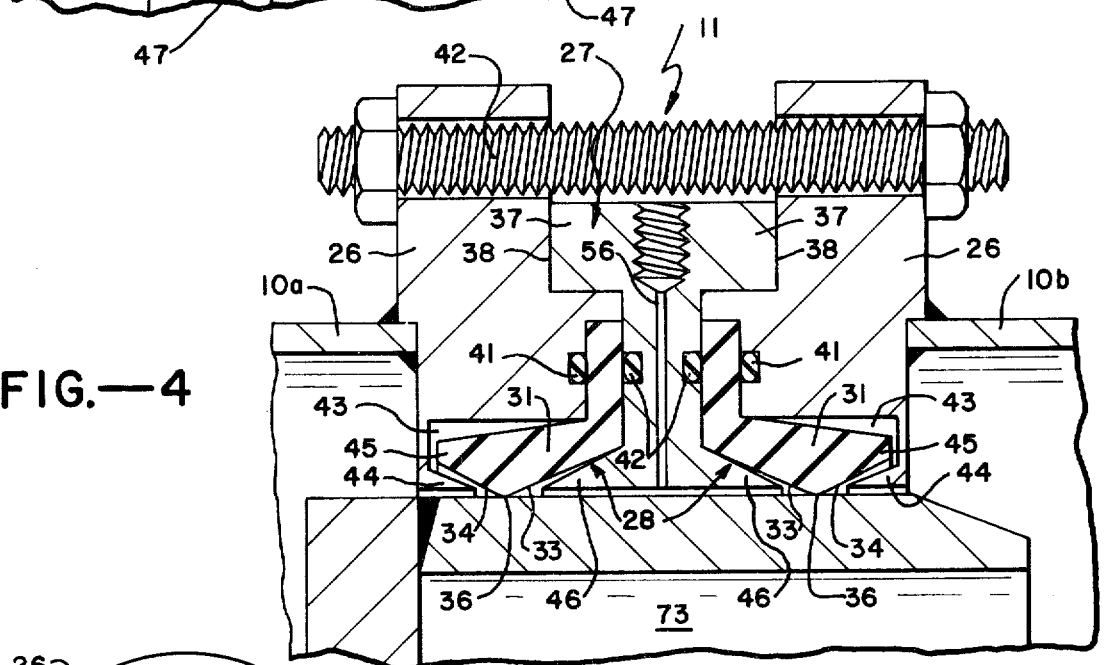
FIG.—4
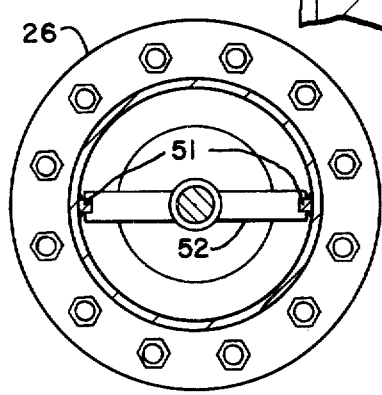
FIG.—5

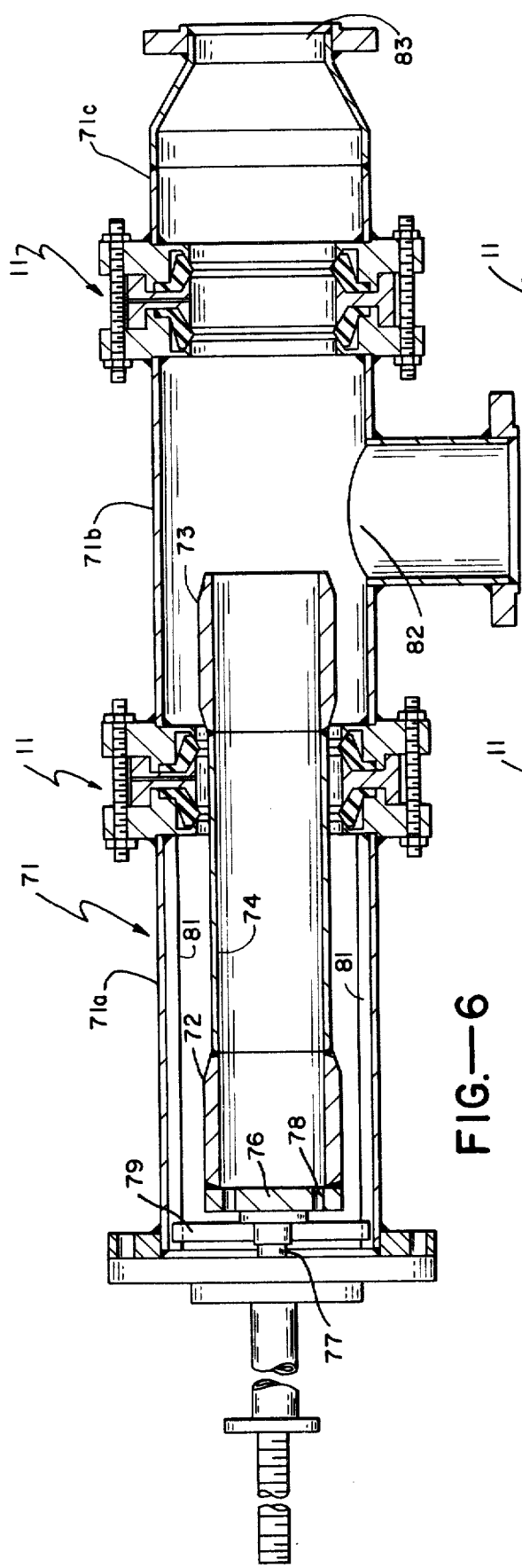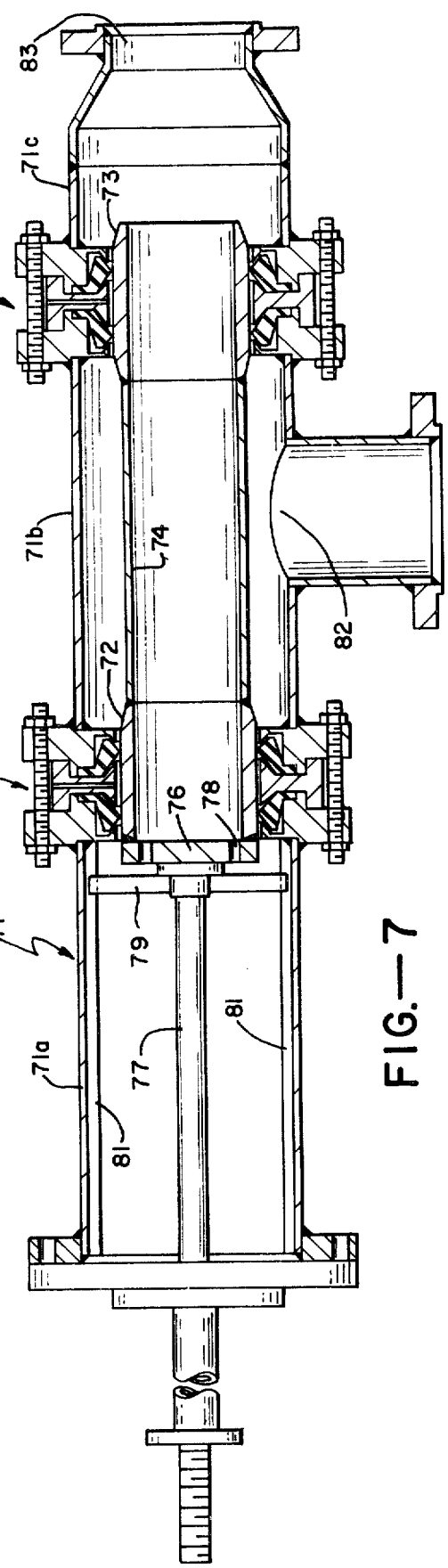

FLOW CONTROL APPARATUS

REFERENCE TO RELATED APPLICATIONS

Reference is made to copending application Ser. No. 350,820 filed Apr. 13, 1973, for "Flow Diverting Apparatus and Method" and application Ser. No. 400,790 filed Sept. 29, 1973 entitled "Flow Control Apparatus".

Background of the Invention

This invention relates generally to apparatus for controlling the flow of various fluids, including gases and liquids. Also the invention relates to meter proving systems making use of such flow control apparatus.

U.S. Pat. No. 3,827,285 discloses a flow control apparatus making use of a plunger-like assembly having oppositely faced cup-shaped sealing members of resilient material, which is moved into and out of a cylindrical sleeve for establishing a seal or permitting fluid flow. Such apparatus has a number of advantages for certain types of services, including the fact that the seal is reliable and is not impaired by the presence of sediment or foreign solids, and the sealing action does not depend upon forcing sealing surfaces together by mechanical means. Another advantage is that the action of the sealing cups provides a self-induced pressure drop between the rims of the cups which can be used to detect leakage. The body construction for such flow control apparatus can be relatively simple compared with the bodies of conventional valves, such as valves of the gate or ball type.

With apparatus as described above, repair or replacement of the sealing cups involves removal of the plunger together with the exterior operator to which it is connected. Also the sleeve is made as an integral part of the body and if damaged, may require a replacement of the body.

Application Ser. No. 350,820 filed Apr. 13, 1973 for "Flow Diverting Apparatus and Method" discloses flow control apparatus making use of the invention of U.S. Pat. No. 3,827,285, but which is provided with more than one assembly.

Summary of the Invention and Objects

In general, it is an object of the present invention to provide flow control apparatus which makes use of the invention disclosed in U.S. Pat. No. 3,827,285 but which has novel sealing means which facilitates use of the apparatus for certain purposes.

Another object of the invention is to provide flow control apparatus of the type described above which provides a sealing assembly having oppositely faced resilient cup-shaped members which can be readily removed for repair or replacement by uncoupling two adjacent body sections.

In general, the present invention meakes use of a body having two or more openings forming flow passages, with the body providing spaces with which the openings communicate. The body is formed in two sections which are coupled together, and the coupling means includes a sealing assembly. The closure which cooperates with the sealing assembly is constructed to provide an exterior cylindrical surface. It is carried in axial alignment with the sealing assembly, and is adapted to be reciprocated between a projected position within the sealing assembly, or to a position in which it is retracted from the sealing assembly to permit flow through the body. The sealing assembly includes oppositely faced cup-shaped annular members of resilient material which establish sealing engagement with the outer cylindrical periphery of the closure when the closure is in its projected position. In one embodiment there is a single closure cooperating with a single sealing assembly. In another embodiment two closures are provided together with two sealing assemblies.

Additional objects and features of the invention will appear from the following description in which the preferred embodiments have been set forth in detail in conjunction with the accompanying drawing.

BRIEF DESCRIPTION OF THE DRAWING

FIG. 1 is a side elevational view in section illustrating flow control apparatus incorporating the invention;

FIG. 2 is a side elevational view like FIG. 1 but showing the closure means in its projected position in which it seals the apparatus against fluid flow;

FIG. 3 is a detail in section showing the construction of the sealing assembly;

FIG. 4 is a view like FIG. 3 but illustrating the manner in which the cup-shaped sealing members engage the cylindrical peripheral surface of the closure;

FIG. 5 is a cross-sectional view taken along the lines 5—5 of FIG. 2;

FIG. 6 is a side elevational view in section showing another embodiment of the invention which makes use of two closures and two sealing assemblies; and FIG. 7 is a view like FIG. 6 but showing the closures in a different operating position.

DESCRIPTION OF THE PREFERRED EMBODIMENTS

The embodiment illustrated in FIGS. 1 and 2 consists of a hollow body 10 made in two sections 10a and 10b. The two sections are secured together by assembly 11 which serves both as a coupling and as a sealing assembly. The main part of the body 10 is cylindrical, and its one end is shown provided with a flange 12 to facilitate attachment of the closure plate 13. Suitable operating means 14 may be mounted upon the plate 13, and for example can consist of the yoke 15 together with a threaded rod 16 which is attached to the operating rod of the apparatus. The remainder of the operating means (not illustrated) may include a nut engaging the threaded rod 16, together with gearing operated manually or by a motor for rotating the nut. In place of such means, operators of the gas pressure or hydraulic type may be employed.

The other end of the body 10 is provided with a portion 10c of reduced diameter to provide the opening or flow passage 17. A side wall of the body is also provided with a flow passage 18, together with a short pipe section 19 which can be coupled to associated piping.

Within the body 10 there is a movable closure 21 which is adapted to be moved to the open retracted position shown in FIG. 1, or to the closed projected position shown in FIG. 2. The closure is annular in section and provides a cylindrical outer peripheral surface 22. Its one end is secured as by welding to the plate or wall 23, which in turn is secured to the operating rod 24. This rod is in alignment with the axis of the body 10 and the axis of the closure 21, and extends through the plate 13 where it is provided with suitable sealing means.

The preferred construction for the sealing assembly 11 is best illustrated in FIGS. 3 and 4. The two flange-like annuluses 26 are secured as by welding to the adjacent body sections 10a and 10b. Between the two annuluses 26 there is a third intermediate annulus 27. Two cup-shaped sealing members 28 are clamped between the members 26 and 27, and are made of suitable resilient material such as synthetic rubber or elastomer. Each of the members 28 includes an annular base portion 29, together with an inner rim portion 31. The base portions 29 are accommodated within annular recesses 32 formed in the opposed faces of the annuluses 26. The rim portions 31 of the sealing members, when relaxed as shown in FIG. 3, are convergent toward the axis of the assembly as they extend outwardly from the base portions 29. The inner peripheral surfaces 33 and 34 of each sealing member conform to oppositely angled truncated cones, and these surfaces join or merge along the annular sealing area 36.

The intermediate member 27 preferably consists of an outer annular portion 37 which is accommodated in recessing 38 formed in the members 26, and a web portion 39 which is interposed between the base portions 29 of the sealing members. Suitable sealing means is provided to ensure against leakage between the base portions 29 and the adjacent surfaces of the members 26 and 39. Thus sealing means of the resilient O-ring type 41 is provided between the base portions and the members 26, and similar sealing means 42 is provided to prevent leakage between the base portions 29 and the portion 39 of the intermediate member 27. Suitable means such as bolts 42 serve to clamp the assembly together.

The assembly also provides means which limits flexing of the resilient portions 31 inwardly. Thus the members 26 are formed to provide the inner annular recesses or cavities 43 which accommodate flexing movement of the portions 31. Also, each member 26 is formed to provide an annular portion 44 which overlaps the edge portion 45 of the corresponding portion 31 of the sealing member. The inner peripheral surface of portion 44 preferably is made to conform to a truncated cone to conform with and provide a proper seat for the edge portion 45 of the corresponding sealing member.

In addition to providing means which engages the outer margins 45 of the sealing members, the intermediate member 27 is provided with inner annular portions 46 which extend for a substantial distance toward the portions 44. The portions 46 likewise are shown provided with outer peripheral surfaces conforming to truncated cones and which conform with the adjacent conical surfaces of the portions 31 of the sealing members 28.

Referring again to the relaxed position of the sealing members 28 shown in FIG. 3, the inner peripheral surfaces of the sealing member portions 31, under such conditions, are seated upon the outer peripheral surfaces of the rigid metal portions 44 and 46. A minor annular area of the sealing members is exposed in the spaces 47 between the portions 44 and 46.

As will be clear from FIGS. 1 and 2, the closure 21 has its axis in alignment with the axis of the assembly 11 and with the axis of the body 10. The outer diameter of the closure 21 is less than the opening provided by the metal annuluses 26 and 27 of the assembly 11, but is greater than the relaxed diameter of the sealing members, having reference particularly to the diameter of the sealing areas 36. When the closure 21 is in the retracted position shown in FIG. 1, fluid is free to flow through the body between the passages 17 and 18. When it is desired to interrupt such flow, the closure is moved to the projected position shown in FIG. 2 and within the assembly 11. As the closure is moved into this closed position, it successively engages the sealing members 29, with the result that the portions 31 of these sealing members are flexed and expanded in a radial direction. This serves to establish sealing contact between the sealing members and the outer cylindrical surface of the closure 21 along the areas 36, with wiping action which serves to insure good sealing contact and to remove any foreign solids. Conversely, when it is desired to permit flow, the closure is moved to its retracted position shown in FIG. 1, and as it moves out of the assembly 11, it successively is disengaged from the sealing members, whereby these members move back to the relaxed positions shown in FIG. 3. It will be noted that with the sealing members in the position shown in FIG. 3, fluid pressure may act upon the exterior surfaces of the portions 31, thus tending to deflect the portions 31 inwardly. This condition occurs on the pressure side of the sealing assembly when the closure is in projected position and serves to urge the areas 36 against the closure. Also when the closure is being moved out of the sealing assembly toward the pressure side and is being separated from the corresponding sealing area 36 of the corresponding sealing member 28, the portions 44 and 46 limit inward flexing of the portion 31. Thus the sealing members 28 are protected against injury that might otherwise occur under high pressure differential and flow rates. Excessive deflection is prevented by sealing of the portions 31 upon the portions 44 and 46 of the members 26 and 27.

Generally it is desirable to prevent rotation of the closure 21 during its operation. This is of importance when the rod 16 is being operated by a rotating nut. The means illustrated for preventing rotation of the closure 21 consists of guide ribs 51 which are secured as by welding to the body 10. Rods 52 have their inner ends secured to the rod 24, and their outer ends are slotted to slidably engage the ribs 51.

Leak detection is also incorporated in conjunction with the sealing assembly. Thus a duct 56 is provided in the member 27, and the inner end of this duct communicates with the closed space 57 which exists when the closure 21 is in its projected position shown in FIG. 4. This closed space is between the inner periphery of the member 27 and the outer cylindrical peripheral surface of the closure 21, and between the sealing areas 36 of the sealing members. Assuming that the duct 56 is closed when the closure 21 moves to its projected position with sequential engagement with the sealing areas 36, its engagement with the inner surface of the last-engaged sealing member, with outward expansion of the same, induces a substantial drop in pressure in the closed space 57, and this drop of pressure and its maintenance while the closure is in its projected position can serve to detect leakage. Suitable means for indicating the self-induced pressure referred to above is shown schematically in FIG. 2. It consists of a pipe 58 which connects the duct 56 with the pressure differential operated electrical switch 59. This switch is one of the type having two closed fluid chambers separated by a movable fluid operated member (e.g., a diaphragm). Movements of the pressure operated member in response to a difference in the fluid pressure applied to the chambers serves in turn to operate electrical contacts. Pipe 60 connects with the other chamber of the switch and leads to the downstream side of the apparatus, as for example, to the interior of the body section 10c, or to a pipe coupled to this body section. The contacts of the switch 59 are shown connected to indicating means such as the electric lamps 61 and 62 (e.g., red and green). The lamps are shown connected in circuits 63 and 64 extending from the contacts of the switch, and with current from a common battery or other source of energy 65. The arrangement is such that when the pressure differential applied to the switch 59 is greater than a specified value, one of the lamps (e.g., green) is illuminated, and when the pressure differential drops to a value below such minimum, the one lamp is extinguished and the other lamp (e.g., red) is illuminated. Assuming use of the apparatus for the control of liquid flow, with opening of passageway 17 on the downstream side, when the closure 21 is moved to the projected position shown in FIG. 2, the self-induced pressure differential actuates the switch 59 whereby the green lamp 61 is illuminated. In the event any leakage occurs past the closure 21, the pressure differential (i.e., the difference in pressure between that existing in the space 57 and the pressure on the downflow side of the closure) is reduced whereby the switch 59 is operated to extinguish the lamp 61 and illuminate the red lamp 62.

It will be evident that the apparatus described above can be employed over a wide range of pressures and flow rates, and may likewise vary widely in size. The characteristics of the sealing assembly are such that the sealing members 28 establish good sealing contact with the peripheral surface of the closure 21, and because of the self-induced pressure differential described above, simple means connected to the duct 56 can be used to indicate leakage. The sealing members are capable of functioning properly over a wide range of line pressures and flow rates, particularly because the flange portions 31 are adequately supported in such a manner as to avoid excessive inward deflection.

As previously indicated, the sealing assembly 11 in effect serves as means for coupling the two body sections 10a and 10b together. In the event it is necessary to replace one of the sealing members 29, it is a simple matter to uncouple the members 26 by removing the bolts 42, after which the members 26 can be separated from the sealing members and from the intermediate annulus 27, thereby permitting removal and replacement of the sealing members.

In the embodiment shown in FIGS. 6 and 7, the body 71 is formed in three sections 71a, 71b and 71c. One sealing assembly 11 is provided between the body sections 71a and 71b, and a second assembly 11 is provided between the body sections 71b and 71c. Each of these assemblies is constructed in the same manner as shown in FIGS. 1 - 4. In place of one closure 21 as shown in FIGS. 1 - 4, there is an assembly consisting of two cylindrical closures 72 and 73. They are secured as by welding to the ends of the hollow strut 74. Closure 72 is secured as by welding to the end plate or wall 76, which in turn is secured to the corresponding end of the operating rod 77. Pressure equalizing vents 78 are provided in the plate 76. The spacing between the cylindrical closures 72 and 73 is such that for the projected position of the closure assembly shown in FIG. 7, both closures are within the sealing assemblies 11. For the retracted position shown in FIG. 6, both closures 72 and 73 are retracted from their respective sealing assemblies.

Rotation of the closures can be prevented by means similar to that shown in FIGS. 1 - 4. Thus arms 79 are shown secured to the operating rod 77 and their outer slotted ends slidably engage the fixed ribs 81.

With the body construction illustrated in FIGS. 6 and 7, one flow passage 82 is provided in a side wall of the body section 71b, and the other flow passage 83 is at the end of the body section 71c.

Operation of the embodiment shown in FIGS. 6 and 7 is similar to that of FIGS. 1 - 4 insofar as the sealing action is concerned. However, when the two closures 72 and 73 are in their projected positions within the sealing assemblies 11, the fluid pressure forces acting on the closures are balanced. This facilitates operation of the apparatus under all pressure conditions, and avoids the necessity of using operators of excessive size.

I claim:

1. In flow control apparatus, a hollow body having spaced openings forming flow passages and spaces within the body communicating with the openings, the body having two sections joined between the spaces, an annular sealing assembly disposed between the body sections, closure means within the body adapted to cooperate with the sealing assembly, the closure means including a closure member having a cylindrical outer surface, and means serving to carry the closure for reciprocation into and out of sealing relationship with the annular sealing assembly to shut off or permit fluid flow between the flow passages, the sealing assembly comprising oppositely faced cup-shaped annular members of resilient material, each member including a base portion and a rim portion on the inner periphery of the base portion, the inner diameter of each rim portion when relaxed being less than the diameter of the closure, said assembly serving to couple the two body sections together.

2. Apparatus as in claim 1 in which said sealing assembly includes annular members secured to the body sections and formed to provide exterior clamping flanges, said members serving to mount the sealing members between the same.

3. Apparatus as in claim 2 in which said sealing assembly includes a third annular member interposed between the aforesaid annular members and said third member.

4. Apparatus as in claim 1 in which the sealing assembly has an opening through the same of a diameter greater than the diameter of the closure, and in which the rim portions of the sealing members when relaxed have an inner diameter less than the diameter of the closure.

5. Apparatus as in claim 3 together with sealing means of the O-ring type forming seals between the base portions of the sealing members and adjacent portions of the flange-like members and the third annular member.

6. Apparatus as in claim 1 in which the body includes three sections and in which two of said sealing assemblies serve to couple said sections together, and in which the closure means consists of two connected closure members adapted to be projected into the sealing assemblies.

* * * * *